(12) United States Patent
Hwang

(10) Patent No.: US 12,187,112 B2
(45) Date of Patent: Jan. 7, 2025

(54) OIL SUPPLY DEVICE AND CONTROL METHOD FOR ELECTRIC VEHICLE POWERTRAIN

(71) Applicants: Hyundai Motor Company, Seoul (KR); Kia Corporation, Seoul (KR)

(72) Inventor: Jin Young Hwang, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/632,851

(22) Filed: Apr. 11, 2024

(65) Prior Publication Data
US 2024/0253450 A1    Aug. 1, 2024

Related U.S. Application Data

(62) Division of application No. 17/861,595, filed on Jul. 11, 2022, now Pat. No. 11,987,113.

(30) Foreign Application Priority Data

Aug. 17, 2021 (KR) .................. 10-2021-0108311

(51) Int. Cl.
*B60K 11/02*      (2006.01)
*F16H 57/04*      (2010.01)
*H02P 29/60*      (2016.01)

(52) U.S. Cl.
CPC .......... *B60K 11/02* (2013.01); *F16H 57/0435* (2013.01); *F16H 57/0436* (2013.01); *H02P 29/60* (2016.02); *F16H 57/0476* (2013.01)

(58) Field of Classification Search
CPC . B60K 11/02; F16H 57/0435; F16H 57/0436; F16H 57/0413; H02P 29/60
See application file for complete search history.

(56) References Cited

U.S. PATENT DOCUMENTS

| | | | | |
|---|---|---|---|---|
| 5,718,302 | A * | 2/1998 | Hasebe | H02K 7/116 180/65.6 |
| 11,231,103 | B2 * | 1/2022 | Staake | F16H 57/0441 |
| 11,486,488 | B2 * | 11/2022 | Helle | F04B 17/03 |
| 11,754,172 | B2 * | 9/2023 | Jo | B60K 11/02 184/6.12 |
| 11,987,113 | B2 * | 5/2024 | Hwang | B60K 11/02 |
| 2014/0294599 | A1 * | 10/2014 | Wi | F04B 23/04 417/18 |

(Continued)

FOREIGN PATENT DOCUMENTS

| KR | 10-2021-0078095 | 6/2021 |
|---|---|---|
| KR | 20220120744 A | 8/2022 |

*Primary Examiner* — Michael A Riegelman
(74) *Attorney, Agent, or Firm* — Morgan, Lewis & Bockius LLP

(57) ABSTRACT

An oil supply device for an electric vehicle powertrain apparatus, includes an electric oil pump, a motor lubrication flow path connected to the electric oil pump and provided to supply oil from the electric oil pump to a bearing of a motor, a motor cooling flow path branched from the motor lubrication flow path to supply oil for cooling the motor from the electric oil pump, and a cooling control valve apparatus provided in the motor cooling flow path to control oil supplied to the motor through the motor cooling flow path according to an operating state of the electric oil pump.

6 Claims, 6 Drawing Sheets

(56) References Cited

U.S. PATENT DOCUMENTS

| | | | | |
|---|---|---|---|---|
| 2014/0294618 A1* | 10/2014 | Jo | ............... | F16H 61/0021 |
| | | | | 417/286 |
| 2015/0167834 A1* | 6/2015 | Hwang | ............... | F16H 61/0031 |
| | | | | 701/66 |
| 2017/0167598 A1* | 6/2017 | Hwang | ............... | F16H 61/0267 |
| 2017/0167599 A1* | 6/2017 | Hwang | ............... | F04C 2/344 |
| 2022/0268355 A1* | 8/2022 | Jo | ............... | B60K 11/02 |
| 2023/0053739 A1* | 2/2023 | Hwang | ............... | B60K 1/00 |
| 2024/0253449 A1* | 8/2024 | Hwang | ............... | B60K 1/00 |
| 2024/0253450 A1* | 8/2024 | Hwang | ............... | B60K 11/02 |

\* cited by examiner

OIL SUPPLY DEVICE AND CONTROL METHOD FOR ELECTRIC VEHICLE POWERTRAIN

CROSS REFERENCE TO RELATED APPLICATION

The present application is a Divisional of U.S. patent application Ser. No. 17/861,595, filed Jul. 11, 2022, which claims priority to Korean Patent Application No. 10-2021-0108311, filed Aug. 17, 2021, the entire contents of which is incorporated herein for all purposes by this reference.

BACKGROUND OF THE PRESENT DISCLOSURE

Field of the Present Disclosure

The present disclosure relates to an oil supply device and control method for lubrication and cooling of an electric vehicle powertrain apparatus.

Description of Related Art

An electric vehicle powertrain apparatus includes a motor and a reducer or a motor and a transmission to transmit the power of the motor to the driving wheels through the reducer or transmission. Generally, the electric vehicle powertrain apparatus is configured to lubricate and cool the reducer or the transmission, and the motor with the oil discharged from an electric oil pump.

Here, the reducer is configured to simply reduce the power of the motor to one gear ratio, and the transmission is configured to reduce the power of the motor to two or more gear ratios. The electric vehicle is provided with the reducer, or otherwise the transmission for the purposes of more improved power performance and reduced motor capacity.

For reference, hereinafter, for convenience, the reducer and the transmission are collectively referred to as a "transmission".

As described above, the oil discharged from the electric oil pump is supplied to the motor and transmission to perform lubrication and cooling. However, when oil is supplied even when cooling of the motor is not necessary due to the low temperature of the motor, unnecessary loss of oil flow rate is caused and the efficiency of the motor is also lowered, ultimately reducing the power efficiency of the electric vehicle.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an oil supply device and control method for an electric vehicle powertrain apparatus, whereby when cooling of a motor is not required due to low temperature of the motor, the motor is prevented from being cooled, avoiding unnecessary consumption of an oil flow rate, rapid warm-up of the motor is possible to allow for improvement in power efficiency of an electric vehicle through more efficient driving of a motor, and a motor may be properly cooled when required to be cooled.

To accomplish the above objective, according to various aspects of the present disclosure, there is provided an oil supply device for an electric vehicle powertrain apparatus, the device including: an electric oil pump; a motor lubrication flow path connected to the electric oil pump and provided to supply oil from the electric oil pump to a bearing of a motor; a motor cooling flow path branched from the motor lubrication flow path to supply oil for cooling the motor from the electric oil pump; and a cooling control valve apparatus provided in the motor cooling flow path to control oil supplied to the motor through the motor cooling flow path according to an operating state of the electric oil pump.

The cooling control valve apparatus may be configured to be elastically supported to open when a pressure of oil supplied from the electric oil pump reaches a predetermined opening pressure.

When the pressure of the oil reaches the opening pressure and the cooling control valve apparatus opens, the cooling control valve apparatus may be self-locked by the pressure of the oil so that the cooling control valve apparatus does not close until the pressure of the oil reaches a predetermined closing pressure lower than the opening pressure.

The cooling control valve apparatus may be configured so that a spring is elastically supported on a first side of a valve spool, a first control flow path on which oil pressure from the electric oil pump acts is connected to a second side of the valve spool, and a second control flow path is connected to supply a portion of the oil supplied to the motor to a self-lock land of the valve spool to pressurize the valve spool toward the spring.

The motor lubrication flow path may branch from a transmission oil flow path supplying oil from the electric oil pump to a transmission.

According to various aspects of the present disclosure, there is provided an oil supply control method for an electric vehicle powertrain apparatus, the method including:
  determining whether a motor temperature is equal to or greater than a predetermined cooling start temperature;
  if the motor temperature is equal to or greater than the cooling start temperature, increasing a speed of the electric oil pump to a predetermined opening speed or higher than the predetermined opening speed;
  when the speed of the electric oil pump increases to the opening speed or above, controlling the electric oil pump in a motor cooling-integrated mode including cooling of a motor;
  determining whether the motor temperature is equal to or lower than a predetermined cooling stop temperature during the motor cooling-integrated mode;
  if the motor temperature is equal to or lower than the cooling stop temperature, lowering the speed of the electric oil pump to a predetermined closing speed or less than the predetermined closing speed; and
  when the speed of the electric oil pump is lowered to the closing speed or less, controlling the electric oil pump in a motor cooling-excluded mode in which the cooling of the motor is excluded.

During controlling in the motor cooling-excluded mode, whether the motor temperature is equal to or greater than the cooling start temperature may be continuously monitored.

The opening speed may be set to form, by the electric oil pump, hydraulic pressure which is opening pressure which is configured for opening the cooling control valve apparatus provided to control the oil supplied to the motor cooling flow path for cooling the motor.

The closing speed may be set to form, by the electric oil pump, hydraulic pressure which is closing pressure which is configured for switching the cooling control valve apparatus provided to control the oil supplied to the motor cooling flow path for cooling the motor from an open state to a closed state.

In the motor cooling-integrated mode, the electric oil pump may be controlled by use of a first control map which is a map of a revolution number of the electric oil pump according to oil temperature and motor revolution number.

In the motor cooling-integrated mode, the electric oil pump may be controlled by adding a compensation revolution number obtained from a second control map which is a map of the compensation revolution number according to driving mileage of a vehicle to the revolution number of the electric oil pump obtained by the first control map.

In the motor cooling-excluded mode, the electric oil pump may be controlled by use of a third control map which is a map of a revolution number of the electric oil pump according to oil temperature and motor revolution number.

In the motor cooling-excluded mode, the electric oil pump may be controlled by adding the compensation revolution number obtained from a fourth control map which is a map of the compensation revolution number according to driving mileage of a vehicle to the revolution number of the electric oil pump obtained by the third control map.

According to an exemplary embodiment of the present disclosure, when cooling of a motor is not required due to low temperature of the motor, the motor is prevented from being cooled thereby avoiding unnecessary consumption of an oil flow rate, rapid warm-up of the motor is possible to allow for improvement in power efficiency of an electric vehicle through more efficient driving of a motor, and a motor may be properly cooled when required to be cooled.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
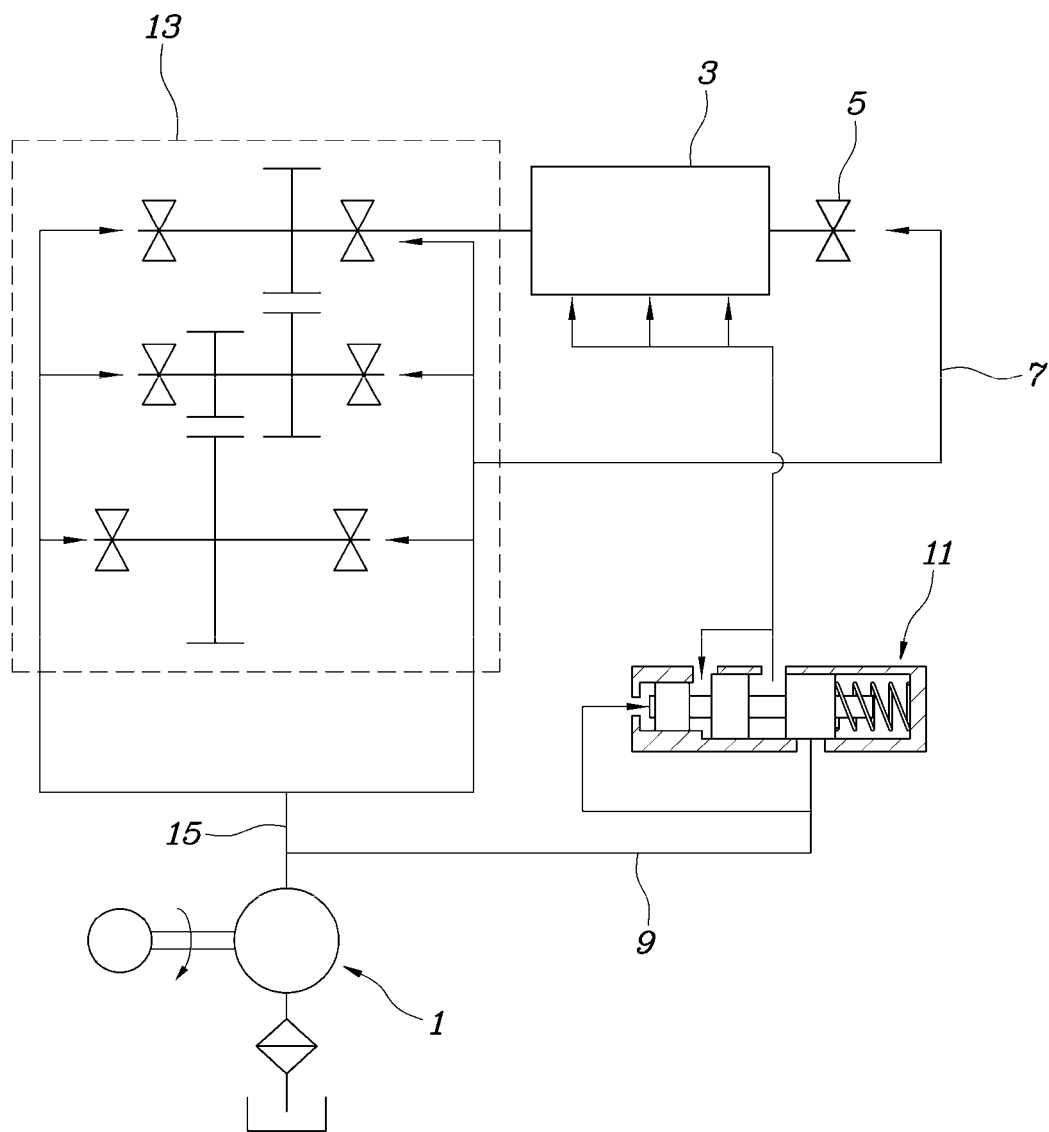
FIG. 1 is a view exemplarily illustrating an oil supply device for an electric vehicle powertrain apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of the embodiments of the present disclosure included herein are merely exemplified for illustrating the embodiments according to an exemplary embodiment of the present disclosure, and the embodiments of the present disclosure are implemented in various forms, and may not be construed as being limited to the embodiments described in the exemplary embodiment or application.

Since the exemplary embodiment according to an exemplary embodiment of the present disclosure can be diversely modified into various forms, specific embodiments will be illustrated and described in detail in the drawings and the description of the present disclosure. However, this is not intended to limit the embodiments according to the concept of the present disclosure to specific disclosure forms, but should be understood to include all modifications, equivalents, or substitutes included in the spirit and scope of the present disclosure.

It will be understood that although the terms "first", "second", etc. may be used herein to describe various elements, these elements should not be limited by these terms. These terms are only used to distinguish one element from another element. Thus, a first element discussed below could be termed a second element and vice versa without departing from the nature of the present disclosure.

It will be understood that when an element is referred to as being "connected" or "coupled" to another element, it may be directly connected or coupled to the other element or intervening elements may be present therebetween. In contrast, when an element is referred to as being "directly connected" or "directly coupled" to another element, there are no intervening elements present. Other expressions describing the relationship between the components, such as "between" and "immediately between" or "neighboring" and "directly neighboring" should also be interpreted in the same manner.

The terminology used herein is for describing various exemplary embodiments only and is not intended to limit the present disclosure. As used herein, the singular forms "a", "an", and "the" are intended to include the plural forms as well, unless the context clearly indicates otherwise. It will be further understood that the terms "comprises" and/or "comprising", or "includes" and/or "including", when used in the present specification, specify the presence of stated features, integers, steps, operations, elements, components or combinations thereof, but do not preclude the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which an exemplary embodiment of the present disclosure pertains. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Hereinafter, exemplary embodiments the present disclosure will be described in detail with reference to the accompanying drawings. Like reference numerals in respective drawings indicate like elements.

Figure 2:
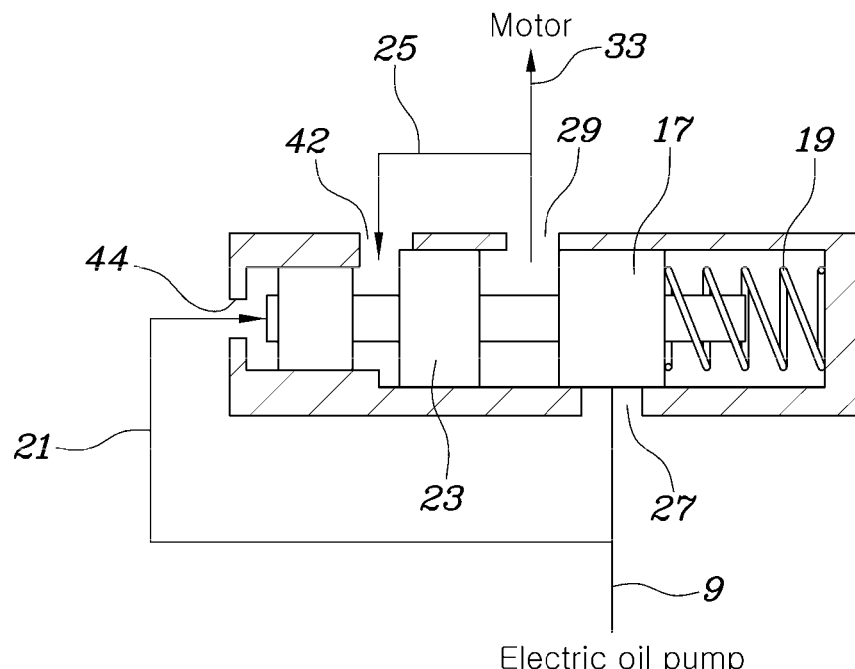
FIG. 2 is a view exemplarily illustrating the comparison between the open and closed states of a cooling control valve apparatus of FIG. 1.
Figure 2:
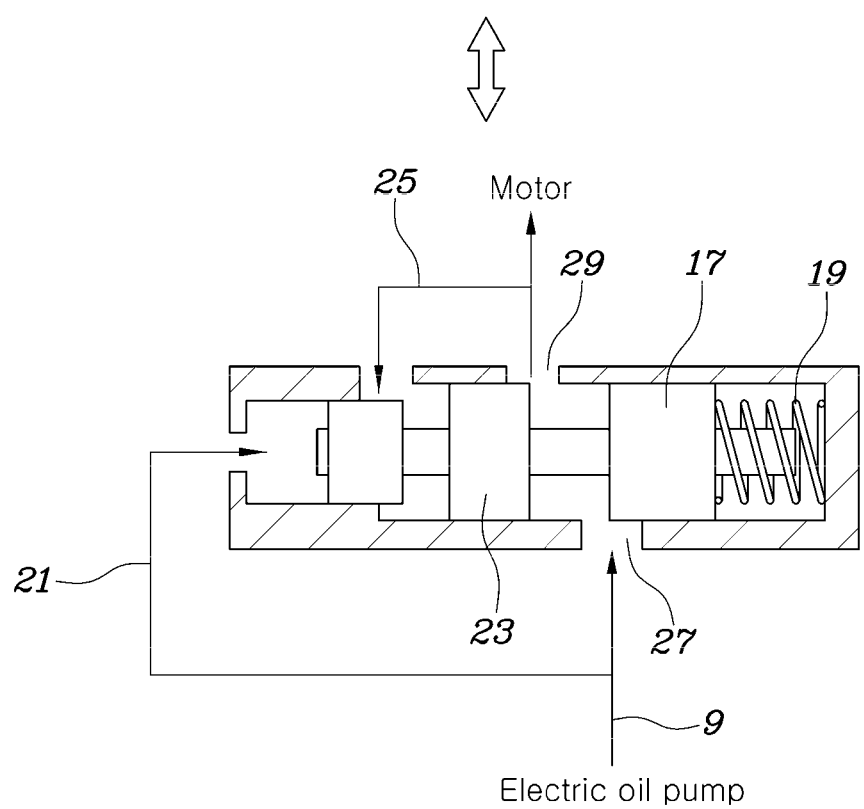

Referring to FIG. 1 and FIG. 2, an exemplary embodiment of an oil supply device for an electric vehicle powertrain apparatus according to an exemplary embodiment of the present disclosure includes an electric oil pump 1; a motor lubrication flow path 7 provided to supply oil from the electric oil pump 1 to a bearing 5 of a motor 3; a motor cooling flow path 9 provided separately from the motor lubrication flow path 7 to supply oil for cooling the motor 3 from the electric oil pump 1; and a cooling control valve apparatus 11 provided in the motor cooling flow path 9 to control the oil supplied to the motor 3 through the motor cooling flow path 9 according to the operating state of the electric oil pump 1.

That is, the oil supply device of the present disclosure allows the oil pumped from the electric oil pump 1 to be continuously supplied to the bearing 5 of the motor 3 through the motor lubrication flow path 7, while the oil for cooling of the motor 3 is controlled by the cooling control valve apparatus 11 provided in the motor cooling flow path 9, so that when the temperature of the motor 3 is low and cooling is unnecessary, the oil is not supplied to the motor 3, facilitating rapid warm-up of the motor 3 to allow for efficient operation of the motor 3 and preventing power consumption for unnecessary oil pumping to improve the power efficiency of an electric vehicle.

In an exemplary embodiment of the present disclosure, the motor lubrication flow path 7 branches from the transmission oil flow path 15 for supplying oil from the electric oil pump 1 to the transmission 13.

That is, referring to FIG. 1, the oil discharged from the electric oil pump 1 branches into the transmission oil flow path 15 and the motor cooling flow path 9, and the oil supplied through the transmission oil flow path 15 is supplied to the transmission 13 to promote cooling and lubrication of the transmission 13. The motor lubrication flow path 7 branches from the transmission oil flow path 15, so that the bearing 5 of the motor is always supplied with oil to form a smooth operation state of the motor 3 with sufficient lubrication, and the motor cooling flow path 9 is configured to supply oil necessary for cooling to the motor 3 under the control of the cooling control valve apparatus 11 separately from the motor lubrication flow path.

The cooling control valve apparatus 11 is elastically supported to open when the pressure of oil supplied from the electric oil pump 1 reaches a predetermined opening pressure.

In the present exemplary embodiment of the present disclosure, when the pressure of the oil reaches the opening pressure and the cooling control valve apparatus opens, the cooling control valve apparatus 11 is self-locked by the pressure of the oil so that the cooling control valve apparatus is not closed until the pressure of the oil reaches a predetermined closing pressure which is lower than the opening pressure.

That is, the cooling control valve apparatus 11 is configured so that a spring 19 is elastically supported by one side of a valve spool 17, a first control flow path 21 on which oil pressure from the electric oil pump 1 acts is connected to a first port 44 formed at the other side of the valve spool 17, and a second control flow path 25 is connected a second port 42 to supply a portion of oil supplied to the motor 3 to a self-lock land 23 of the valve spool 17 to allow the valve spool 17 to be pressurized toward the spring 19.

Accordingly, the oil supplied from the electric oil pump 1 through the motor cooling flow path 9 is supplied to an inlet port 27 of the cooling control valve apparatus 11 with the pressure above the opening pressure. At the same time, when the oil is supplied through the first control flow path 21, the valve spool 17 moves forward against the elastic force of the spring 19 to allow the inlet port 27 to communicate with an outlet port 29 to which the motor 3 is connected via a motor cooling flow supply path 33, forming a state in which the oil supplied from the electric oil pump 1 is supplied from the inlet port 27 through the outlet port 29 to the motor 3.

At the present time, a portion of the oil supplied from the outlet port 29 to the motor 3 is supplied to pressurize the self-lock land 23 through the second control flow path 25 so that when once opened, the cooling control valve apparatus 11 is maintained in a stable open state, allowing for stable supply of oil required for cooling the motor even when the pressure of oil supplied from the electric oil pump 1 to the motor cooling flow path 9 vibrates near the opening pressure.

Accordingly, the opening pressure is a pressure configured for opening the cooling control valve apparatus 11, and the closing pressure is a pressure configured for closing the cooling control valve apparatus 11. Both the pressures may be adjusted by the cross-sectional land area of the spring 19 and the valve spool 17.

Of course, by setting the closing pressure to be sufficiently lower than the opening pressure, even in a state in which the oil through the second control flow path 25 is supplied to the self-lock land 23, when the pressure of the oil supplied from the electric oil pump 1 is less than the closing pressure, the valve spool 17 is moved to the left side of FIG. 2 by the elastic force of the spring 19, so that the motor cooling flow path 9 may be blocked.

Figure 3:
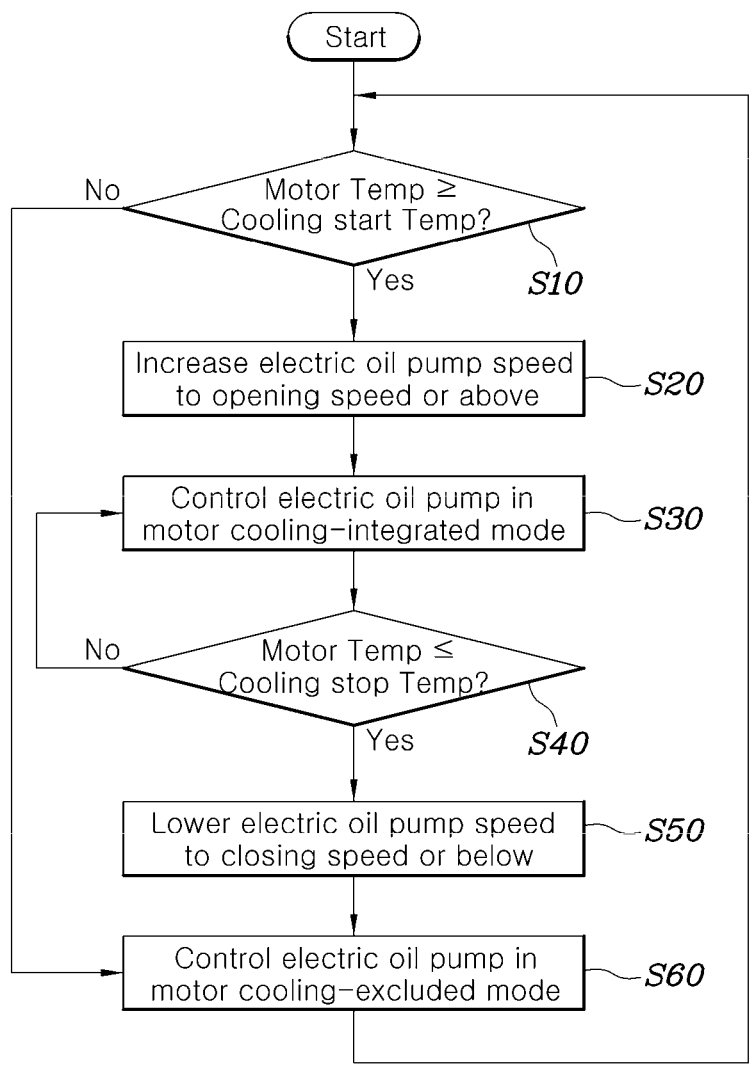
FIG. 3 is a flowchart illustrating an exemplary embodiment of an oil supply control method for an electric vehicle powertrain apparatus according to an exemplary embodiment of the present disclosure.
Figure 4:
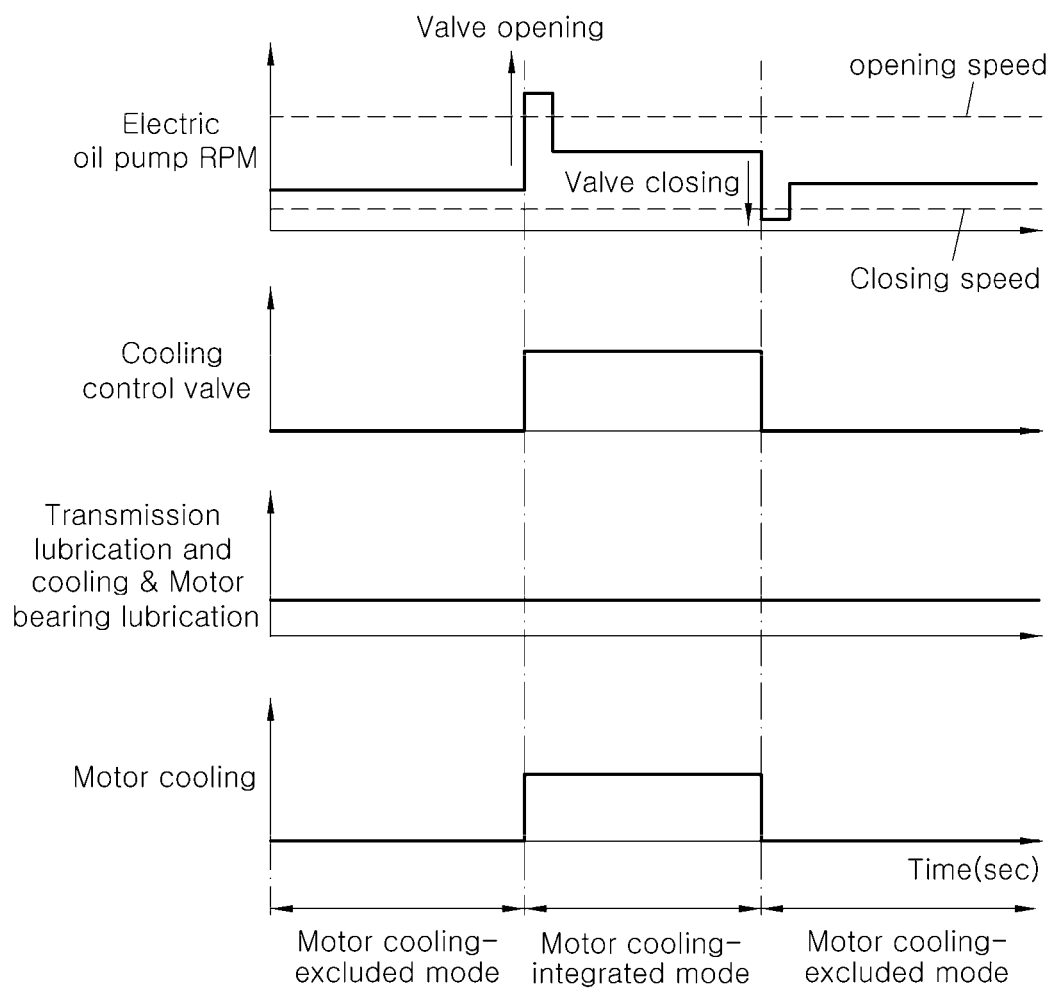
FIG. 4 is a diagram illustrating a process in which the oil supply control method for an electric vehicle powertrain apparatus according to an exemplary embodiment of the present disclosure is performed in a graph.

For reference, FIG. 2 comparatively illustrates a connected state and a blocked state in which the motor cooling flow path 9 is connected and blocked as the valve spool 17 of the cooling control valve apparatus 11 is moved to the left and right Referring to FIG. 3 and FIG. 4, an oil supply control method for an electric vehicle powertrain apparatus according to various exemplary embodiments of the present disclosure may include determining whether a motor temperature is equal to or greater than a predetermined cooling start temperature (S10); when the motor temperature is equal to or greater than the cooling start temperature, increasing the speed of the electric oil pump to a predetermined opening speed or higher (S20); when the speed of the electric oil pump increases to the opening speed or above, controlling the electric oil pump 1 in a motor cooling-integrated mode including cooling of the motor 3 (S30); determining whether the motor temperature is equal to or lower than a predetermined cooling stop temperature during the motor cooling-integrated mode (S40); when the motor temperature is equal to or lower than the cooling stop temperature, lowering the speed of the electric oil pump to a predetermined closing speed or less (S50); and when the speed of the electric oil pump is lowered to the closing speed or less, controlling the electric oil pump 1 in a motor cooling-excluded mode in which cooling of the motor is excluded (S60).

Furthermore, during controlling in the motor cooling-excluded mode, whether the motor temperature is equal to or greater than the cooling start temperature is continuously monitored.

That is, the present disclosure repeatedly performs the above steps while monitoring the temperature of the motor 3 as described above during the operation of a vehicle, so that when the temperature of the motor 3 becomes the cooling start temperature or above, the speed of the electric oil pump 1 is increased to the opening speed or greater and the electric oil pump 1 is controlled in the motor cooling-integrated mode as well, and when the temperature of the motor 3 becomes the cooling stop temperature or less, the speed of the electric oil pump 1 is lowered to the closing speed or less and the electric oil pump 1 is controlled in the motor cooling-excluded mode as well.

Here, the cooling start temperature may be set to a minimum temperature that requires cooling of the motor 3, and the cooling stop temperature may be set to a maximum temperature that does not require cooling of the motor 3. The temperatures may be appropriately set by a number of experiments and analysis, and the cooling stop temperature is set lower than the cooling start temperature.

Furthermore, the opening speed is set to form, by the electric oil pump 1, hydraulic pressure, i.e., opening pressure that can open the cooling control valve apparatus 11 provided to control the oil supplied to the motor cooling flow path 9 for cooling the motor.

Accordingly, in the motor cooling-integrated mode, the cooling control valve apparatus 11 is opened to perform cooling of the motor 3 with the oil supplied from the electric oil pump 1.

Of course, the present motor cooling-integrated mode does not only perform cooling of the motor 3, but also basically performs lubrication and cooling of the transmission 13 and lubrication of the bearing 5 of the motor, additionally cooling the motor 3.

Figure 5:
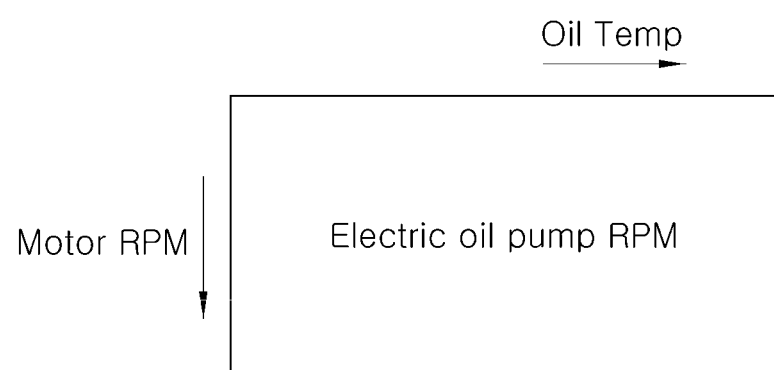
FIG. 5 is a view exemplarily illustrating a first control map which is a map of revolution number of the electric oil pump according to oil temperature and revolution number of a motor.

In the motor cooling-integrated mode, the electric oil pump 1 is controlled by use of a first control map as illustrated in FIG. 5 which is a map of revolution speed of electric oil pump according to oil temperature and revolution speed of a motor.

Here, the revolution number of the motor and the revolution number of the electric oil pump in the first control map are revolution number in unit of revolutions per minute (RPM), and actually mean the revolution speed.

Accordingly, when revolution number of the electric oil pump according to the current oil temperature and the motor revolution number is obtained from the first control map, the obtained revolution number is substantially target control speed of the electric oil pump 1.

Of course, the revolution speed of the electric oil pump according to the revolution number of the electric oil pump in the first control map is basically set to be greater than the closing speed.

Furthermore, in the first control map, the revolution speed of the electric oil pump is set to increase as the oil temperature increases and the motor revolutions per minute (rpm) increases.

Figure 6:
FIG. 6 is a view exemplarily illustrating a second control map which is a map of compensation revolution number according to driving mileage of a vehicle.

On the other hand, in the motor cooling-integrated mode, the electric oil pump 1 may be controlled by adding the compensation revolution number obtained from the second control map as illustrated in FIG. 6, which is a map of the compensation revolution number according to the driving mileage of a vehicle, to the revolution number of the electric oil pump obtained by the first control map.

Of course, the second control map is set to a higher compensation revolution number as the driving mileage of a vehicle increases so that the leakage flow rate due to the aging of an oil supply device may be properly compensated.

The closing speed is set to form, by the electric oil pump 1, hydraulic pressure, i.e., closing pressure that can switch the cooling control valve apparatus 11 provided to control the oil supplied to the motor cooling flow path 9 for cooling the motor from an open state to a closed state.

Therefore, in the motor cooling-excluded mode, the cooling control valve apparatus 11 is closed so that the oil supplied from the electric oil pump 1 to the motor cooling flow path 9 does not pass through the cooling control valve apparatus 11 so as not to be supplied to the motor.

Of course, in the present motor cooling-excluded mode, cooling of the motor 3 is not performed, but lubrication and cooling of the transmission 13 and lubrication of the bearing 5 of the motor 3 are continuously performed.

Figure 7:
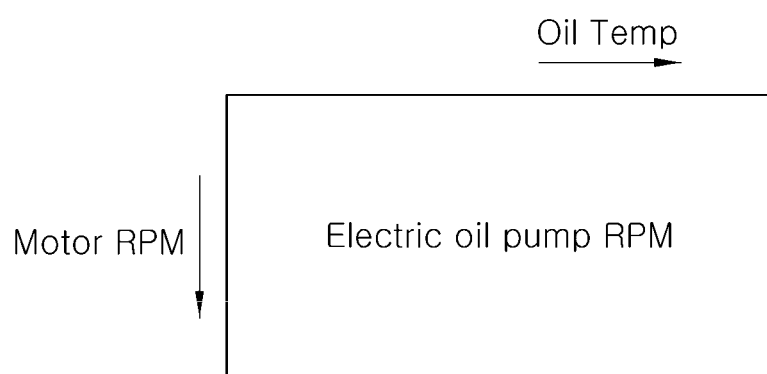
FIG. 7 is a view exemplarily illustrating a third control map which is a map of revolution number of the electric oil pump according to oil temperature and revolution number of a motor.

In the motor cooling-excluded mode, the electric oil pump 1 is controlled using a third control map as illustrated in FIG. 7 which is a map of revolution number of the electric oil pump according to oil temperature and motor revolution number.

Like the first control map, the revolution number of the electric oil pump in the third control map is in unit of RPM, which actually means revolution speed.

Of course, the speed of the electric oil pump according to the revolution number of the electric oil pump in the third control map is basically set to be less than the opening speed.

Therefore, it is possible to obtain a hysteresis effect of preventing the frequent opening and closing of the cooling control valve apparatus 11 due to the difference between the opening and closing speeds. The opening and closing speeds may be appropriately designed by a number of experiments and analysis.

Of course, the opening speed and the closing speed are respectively related to the opening pressure and the closing pressure, and may be changed according to the specifications of the electric oil pump 1 and the cooling control valve apparatus 11.

Furthermore, in the third control map, the revolution speed of the electric oil pump is set to increase as the oil temperature increases and the motor revolution speed increases.

Figure 8:
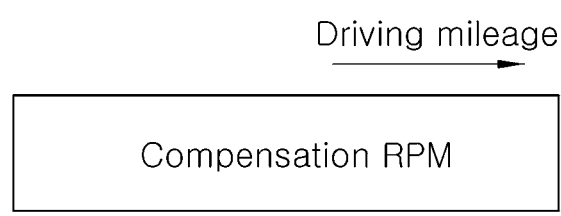
FIG. 8 is a view exemplarily illustrating a fourth control map which is a map of compensation revolution number according to driving mileage of a vehicle.

On the other hand, in the motor cooling-excluded mode, the electric oil pump 1 may be controlled by adding the compensation revolution number obtained from the fourth control map as illustrated in FIG. 8, which is a map of the compensation revolution number according to the driving mileage of a vehicle, to the revolution number of the electric oil pump obtained by the third control map.

Of course, even in the fourth control map, it is preferable to output a higher compensation revolution number as the driving mileage of a vehicle increases, compensating for the leakage flow rate due to the aging of an oil supply device to an appropriate level.

Of course, when the motor cooling-excluded mode is performed as described above, it is not necessary to pump the oil supplied for cooling the motor 3, so it is possible to reduce the power consumed by the electric oil pump 1 and to improve the durability of the electric oil pump 1 as well.

In various exemplary embodiments of the present disclosure, a controller is used to perform oil supply control method.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An oil supply apparatus for an electric vehicle powertrain apparatus, the oil supply apparatus comprising:
   an electric oil pump;
   a motor lubrication flow path connected to the electric oil pump and provided to supply oil from the electric oil pump to a bearing of a motor;
   a motor cooling flow path branched from the motor lubrication flow path to supply oil for cooling the motor from the electric oil pump;
   a cooling control valve apparatus provided in the motor cooling flow path to control oil supplied to the motor through the motor cooling flow path according to an operating state of the electric oil pump; and
   a controller configured for:
     determining whether a motor temperature is equal to or greater than a predetermined cooling start temperature;
     when the motor temperature is equal to or greater than the predetermined cooling start temperature, increasing a speed of the electric oil pump to a predetermined opening speed or higher than the predetermined opening speed;
     when the speed of the electric oil pump increases to the predetermined opening speed or more than the predetermined opening speed, controlling the electric oil pump in a motor cooling-integrated mode including cooling of the motor;
     determining whether the motor temperature is equal to or lower than a predetermined cooling stop temperature during the motor cooling-integrated mode;
     when the motor temperature is equal to or lower than the predetermined cooling stop temperature, lowering the speed of the electric oil pump to a predetermined closing speed or less than the predetermined closing speed; and when the speed of the electric oil pump is lowered to the predetermined closing speed or less than the predetermined closing speed, controlling the electric oil pump in a motor cooling-excluded mode in which the cooling of the motor is excluded.

2. The oil supply apparatus of claim 1, wherein the predetermined opening speed is set to form, by the electric oil pump, hydraulic pressure which is opening pressure which is configured for opening the cooling control valve apparatus provided to control the oil supplied to the motor cooling flow path for cooling the motor.

3. The oil supply apparatus of claim 1, wherein the predetermined closing speed is set to form, by the electric oil pump, hydraulic pressure which is closing pressure which is configured for switching the cooling control valve apparatus provided to control the oil supplied to the motor cooling flow path for cooling the motor from an open state to a closed state.

4. The oil supply apparatus of claim 1, wherein in the motor cooling-integrated mode, the electric oil pump is controlled by use of a first control map which is a map of a revolution number of the electric oil pump according to oil temperature and motor revolution number.

5. The oil supply apparatus of claim 1, wherein in the motor cooling-integrated mode, the electric oil pump is controlled by adding a compensation revolution number obtained from a second control map which is a map of the compensation revolution number according to driving mileage of a vehicle to the revolution number of the electric oil pump obtained by the first control map.

6. The oil supply apparatus of claim 1,
wherein in the motor cooling-excluded mode, the electric oil pump is controlled by use of a third control map which is a map of a revolution number of the electric oil pump according to oil temperature and motor revolution number, and
wherein in the motor cooling-excluded mode, the electric oil pump is controlled by adding a compensation revolution number obtained from a fourth control map which is a map of the compensation revolution number according to driving mileage of a vehicle to the revolution number of the electric oil pump obtained by the third control map.

* * * * *